C. OBREBOWICZ.
HOT WATER HEATING PLANT FOR BUILDINGS.
APPLICATION FILED FEB. 10, 1904.
904,215.
Patented Nov. 17, 1908.
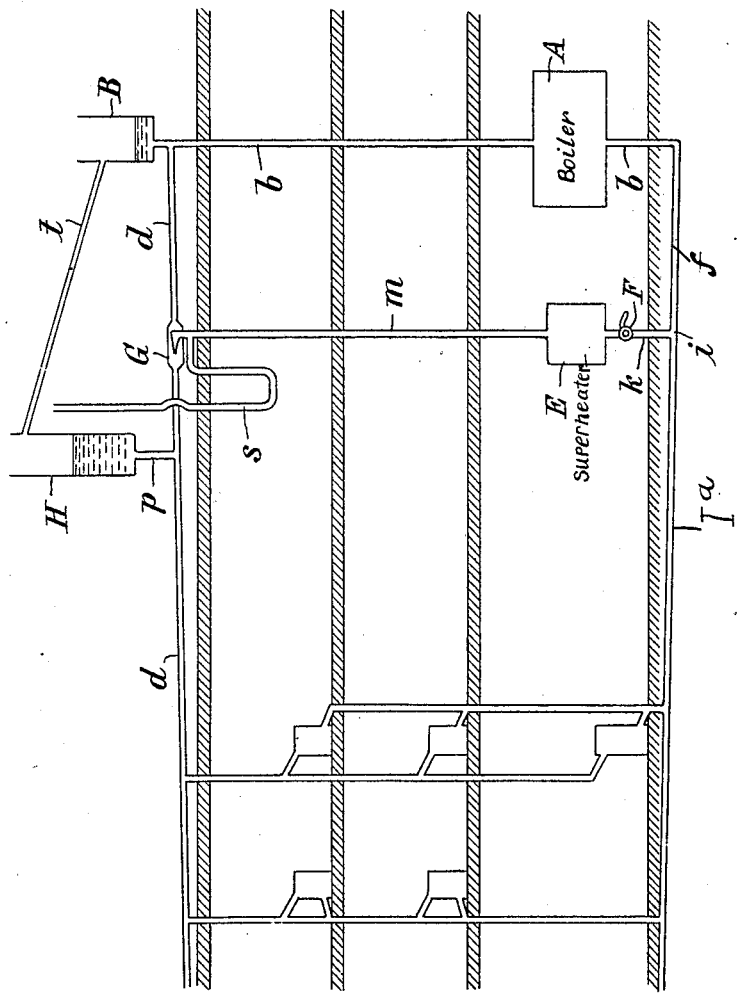
WITNESSES
INVENTOR
Casimir Obrebowicz
BY
ATTYS

UNITED STATES PATENT OFFICE.

CASIMIR OBREBOWICZ, OF WARSAW, RUSSIA.

HOT-WATER HEATING PLANT FOR BUILDINGS.

No. 904,215.      Specification of Letters Patent.      Patented Nov. 17, 1908.

Application filed February 10, 1904. Serial No. 192,943.

*To all whom it may concern:*

Be it known that I, CASIMIR OBREBOWICZ, a citizen of the Empire of Germany, residing at Warsaw, in Russian Poland, Empire of Russia, have invented certain new and useful Improvements in Hot-Water Heating Plants for Buildings, of which the following is a specification.

My invention relates to heating plants of the kind in which hot water (below or above 100° C.) is made to circulate through the radiators situated in a building, the water being generally led from the boiler, by means of a riser, to a distributing main, and back to the boiler by a return main, the two mains being connected with each other by the feed-pipes for, and waste-pipes of, the said radiators.

My improvements in heating plants of this kind consist in certain arrangements and combinations of parts, as are more fully described hereinafter, and the objects of my improvements are, first, to accelerate the circulation of the water, second, to heat the circulating water by mixing it with superheated water, and third, to adjust the speed of the circulation and the temperature of the circulating water according to the temperature of the outer air, as well as to the wishes of the inhabitants of the building.

I attain these objects by the means represented diagrammatically in the accompanying drawing, and shown in connection with a heating-plant (also diagrammatically represented), in which several systems are made use of to show the applicability of the invention to systems of various kinds. These systems being known to every expert, and clearly intelligible from the drawing, I abstain from giving a detailed description of the same. The novel arrangement may be employed in connection with any of these systems.

It consists principally of a water-superheater E, of an injector G, and of two connecting pipes $k$ and $m$. The casing of said injector G is inserted into the circuit of a hot water heating plant, and said superheater E is connected by the pipe $m$ to the nozzle of said injector, and by the pipe $k$ to any suitable point of the circuit of said heating-plant.

The water to be superheated in the superheater E, is taken from the circuit, preferably from the return main, through the feed pipe $k$, which contains a cock or valve F, and is re-conducted into the distributing main through the pipe $m$ and the connection to the injector's nozzle. At the place where the superheated water or the mixture of hot water and steam is reconducted into the main, the injector G of any known or suitable type is inserted, the arrangement being such that the injector is operated by that superheated water, or mixture of hot water and steam, in order to suck the return water from the circuit and to press it into the distribution main, and to heat this return water by mixing it with the superheated water.

In the form of construction shown as an example in the drawing, the superheater E is connected by the feed-pipe $k$ at $i$ with the point where the lower main $f$ commences to form the riser proper $b$ (which, of course, belongs to the whole of the conduit constituting the circuit), and by the pipe $m$ to the injector G. In this example the regulation of the quantity of water led through the superheater is effected by the cock F that is located in the feed-pipe $k$, but instead of this cock any other of the known regulating-means may, of course, be employed. The superheated water or the mixture of hot water and steam passing upwards through the pipe $m$ operates the injector G in known manner, *i. e.* the flow of the circulating water from the pipe $b$ through the main $d$, or, in other words, the circulation of the water within the whole circuit acted upon by the injector is accelerated, and at the same time the temperature of that water is raised in proportion to that part of the water that has been conducted through the superheater E. Therefore, by changing this quantity of water, as well as the intensity of the heat which the superheater is exposed to, and also by suitably adjusting the injector, the speed as well as the temperature of the circulating water may be regulated exactly to any requirement, as will be clear to every expert without any further explanation.

For the sake of completeness I mention, that besides the ordinary expansion vessel B I prefer to employ a water-receiving or pressure vessel H connected with the main $d$ by a pipe $p$ and with the vessel B by a pipe $t$. The water forced by the injector G into the main $d$ is forced partly also into the vessel H, and as soon as a certain predetermined height or level is reached, the surplus of water then entering the vessel H from below passes over through a pipe $t$ into the vessel B, from which it is re-conducted into the circuit, as shown. The head of water obtained in the vessel H allows of ascertaining or measuring the strength of the circulation, and the regulation of the plant may thus be made dependent upon that head. Where hot water below 100° C. is circulated in the heating plant, the vessels B and H may be open, but where hot water above 100° C. is made use of, the two vessels should be closed. There may be employed, of course, safety devices of any of the types known for such purposes, but I prefer to provide a siphon $s$ arranged at, and connected with, the pipe $m$, the free leg of the siphon extending upwards to a suitable height. Thus in case the pressure in the pipe $m$ should become greater than corresponds to the head of the siphon $s$, the excess escapes through said siphon, the escaping water being preferably conducted either into the vessel B or into the vessel H. The siphon $s$ extends above the highest water level.

In the drawing A is the main boiler for storing up hot water during the action of the superheater and this water may circulate in the heating plant, specially in its part marked $I^a$ in the drawing, while the superheater's action is interrupted. If such a hot water reservoir will be inserted in the main riser $b$, it may supply hot water to the whole heating plant during the interruption of the superheater's action.

Having now described my invention, what I desire to secure by a patent of the United States is:

1. A water heating plant comprising the main circuit of feed and return pipes, the pipes and radiators connecting said feed and return pipes, an expansion vessel connected to said circuit, an injector in the main feed pipe, a superheater having immediate pipe connection with the main circuit and with the injector, a throttling device in the pipe connection between the superheater and flow pipe and a siphon-shaped safety pipe connected to the pipe which connects the superheater to the nozzle of said injector, the upper end of said siphon extending to a point located above the water level of the plant.

2. A water heating plant comprising the main circuit of feed and return pipes, the pipes and radiators connecting said feed and return pipes, an expansion vessel connected to said circuit, an injector in the main feed pipe, a superheater having immediate pipe connection with the main circuit and with the injector, a throttling device in the pipe connection between the superheater and flow pipe and a pressure vessel and pipes connecting said vessel with the main circuit at a place located on the opposite side of the injector, relatively to said expansion vessel.

3. A water heating plant comprising the main circuit of feed and return pipes, the pipes and radiators connecting said feed and return pipes, an expansion vessel connected to said circuit, an injector in the main feed pipe, a superheater having immediate pipe connection with the main circuit and with the injector, a throttling device in the pipe connection between the superheater and flow pipe, a siphon-shaped safety pipe connected to the pipe which connects the superheater to the nozzle of said injector, the upper end of said siphon extending to a point located above the water level of the plant, and a pressure vessel and pipes connecting said vessel with the main circuit at a place located on the opposite side of the injector, relatively to said expansion vessel.

In testimony whereof I have signed my name to this specification in the presence of two subscribing witnesses.

CASIMIR OBREBOWICZ.

Witnesses:
MATTHEW B. OLEZEWSKI,
B. ZALTASKI.